United States Patent [19]
Bjork et al.

[11] Patent Number: 5,574,557
[45] Date of Patent: Nov. 12, 1996

[54] APPARATUS AND METHOD FOR PERFORMING SUB-POISSONIAN INTERFERENCE MEASUREMENTS USING AN INTENSITY-SQUEEZED STATE

[75] Inventors: Gunnar Bjork, Mountain View; Shuichiro Inoue, Palo Alto, both of Calif.

[73] Assignees: The Board of Trustees of The Leland Stanford Junior University, Palo Alto, Calif.; Research Development Corporation of Japan, Japan

[21] Appl. No.: 436,579

[22] Filed: May 8, 1995

[51] Int. Cl.$^6$ .................................... G01B 9/02
[52] U.S. Cl. ........................................ 356/345
[58] Field of Search ....................... 356/345, 35.5, 356/361

[56] References Cited

FOREIGN PATENT DOCUMENTS

WO94/05967  3/1994  WIPO ..................... 356/345

*Primary Examiner*—Frank Gonzalez
*Assistant Examiner*—Amanda Merlino

*Attorney, Agent, or Firm*—Lumen Intellectual Property Services

[57] ABSTRACT

The invention demonstrates an apparatus and a method for performing sub-Poissonian interference measurements using an interferometer with a beam splitting element, a first photon input A, a second photon input B, a first photon output C, and a second photon output D. The apparatus has an optical path length adjustment for introducing an optical path length difference θ such that the interferometer operates as a phase-dependent beam-splitter. In this mode photons delivered to the first photon input A exit through the first photon output C and photons delivered to the second photon input B exit through the second photon output D. The apparatus also has a radiation generating device for producing photons in an intensity-squeezed state in which the amplitude $a_o^2$ of the photons ms substantially certain and the phase φ of the photons is substantially uncertain, and for delivering the photons to photon inputs A, B. The radiation generating device has an electrical current source, a resistive element connected in series with the electrical current source, and a photo-emitter element connected in series with the resistive element. The photo-emitter generates n of photons in the squeezed-intensity state during time period $\tau_p$.

12 Claims, 5 Drawing Sheets

COHERENT STATE
$\langle A(t) \rangle = \langle A_1 \rangle = a_o$
$\langle \phi(t) \rangle = 0$

AMPLITUDE PROBABILITY DISTRIBUTION

FIG. 1C

VACUUM STATE
FIG. 2

SQUEEZED-VACUUM STATE
FIG. 3

FIG. 4A

QUASI-FOCK STATE

APPARATUS AND METHOD FOR PERFORMING SUB-POISSONIAN INTERFERENCE MEASUREMENTS USING AN INTENSITY-SQUEEZED STATE

BACKGROUND - FIELD OF THE INVENTION

The present invention relates to the field of optical measurement devices and techniques, and in particular to interferometric measurements in the sub-Poissonian accuracy range.

BACKGROUND - DESCRIPTION OF PRIOR ART

Interferometers split a beam of light of a given wavelength into two beams, direct each split beam along a different optical path, and then recombine the split beams. When the optical lengths of the two paths are equal or differ by an integral number of wavelengths the recombined beams have the same phase. Otherwise, a there is a phase difference $\Delta\phi$ between the two recombined beams. This phase difference $\Delta\phi$ can be measured and is directly related to the discrepancy in optical path length.

This property renders interferometers useful in determining physical changes in materials placed in the optical paths of the split beams. Most notably, interferometers can measure strain, compression, changes in the refractive index, and many additional characteristics of a test material. Other interferometric measurements do not involve materials, but focus instead on actual changes in the lengths of the interferometer's optical paths. Such measurements can be used to determine movements such as rotations and accelerations of a physical systems carrying the interferometer.

In making precision measurements interferometers take advantage of laser light because it is spectrally pure and has a well-defined wavelength. Practical limitations on measurement sensitivity are dictated by the laws of quantum mechanics. In standard situations only one, e.g., input A (FIG. 7), of the interferometer's two inputs is used. Omnipresent zero-point field fluctuations enter through the unused input, B, and interfere with the laser light admitted through the other input. This type of quantum noise is inherent to the vacuum state and can not be suppressed unless the vacuum state is altered. The minimum phase-shift detectable with conventional interferometry is $1/\sqrt{n}$ radians, where n is the total number of photons detected during the measurement time. This relation between the total number of photons measured and phase-shift uncertainty is governed by Poissonian statistics. (For a Poissonian distribution the variance is equal to the mean value.) Hence, conventional interferometry is limited by Poissonian statistics.

Correlated photon intensity interferometry is a known method for reducing quantum noise to increase measurement sensitivity. In particular, this approach makes use of light whose intensity noise is perfectly correlated. Both inputs A and B receive this light. The noise is later removed by photo-count subtraction in the photo-detectors positioned at the interferometer outputs C and D.

Unfortunately, the lasers and optical arrangement to deliver light with perfectly correlated quantum noise is very complicated and costly. Presently there is no practical means to produce two perfectly intensity-correlated light-beams with high optical intensity. The production of photon-pairs is also relatively complicated. Nonetheless, the sensitivity gain of a photon-pair interferometer over a conventional interferometer described above is limited to a modest factor of $\sqrt{2}$.

The most recent development aimed at reducing the effects of this quantum noise relies on changing the quantum statistical signature of the zero-point field to reduce the fluctuations in one quadrature of the field. This technique is sometimes called squeezed zero-point field optical interferometry. The uncertainty principle allows a reduction, or squeezing, of the zero-point field in one quadrature at the expense of increased noise in the conjugate quadrature. Technically, this is done by down-converting the frequency of light in a degenerate parametric amplifier. In order to keep the squeezed zero-point field phase-locked to the laser light incident on input A a portion of the laser light is split before the laser beam impinges on input A and processed by second-harmonic generation oscillators and parametric down-converters to generate a properly squeezed zero-point field. This treatment requires increasingly more energy the more quantum noise reduction, since more photons must be contained in the phase-locked zero-field incident on input B.

Theoretically, the minimum phase-shift measurable with this new method is 1/n radians and represents a considerable improvement over traditional interferometry. Unfortunately, imperfections in the optical arrangements (e.g., imprecise beam splitters) will lead to significant detector fluctuations, even when the incident squeezed zero-point field is void of fluctuations in the proper quadrature. In fact, the interferometer sensitivity is not increased for a given number of generated photons if the energy spent to produce the squeezed zero-point field is also counted, since the squeezing process in non-linear crystals used in parametric down-converters is very inefficient.

It is apparent from the above discussion that the existing technologies do not effectively reduce quantum noise. Furthermore, these techniques require expensive optical and electronic arrangements, as well as precisely regulated high-power lasers. All of these aspects render the technologies incompatible with low-cost, high volume semiconductor thin-film device fabrication, as would be desirable for further advances in practical interferometric applications.

OBJECTS AND ADVANTAGES OF THE INVENTION

In view of the above, the main object of the invention is to provide an apparatus and method for improving the sensitivity of interferometric measurements performed with any optical interferometer to 1/n radians, where n is the total number of photons detected during the measurement time. Another object of the invention is to miniaturize such an apparatus in the form of an integrated optoelectronic component and make the fabrication process compatible with low-cost, high volume semiconductor thin-film fabrication methods.

These and other objects and advantages will become more apparent after consideration of the ensuing description and the accompanying drawings.

SUMMARY OF THE INVENTION

Surprisingly, the inventors have found that sub-Poissonian interferometric measurements below the $1/\sqrt{n}$ sensitivity limit are possible and feasible. In particular, the invention demonstrates an apparatus and a method for performing sub-Poissonian interference measurements.

The apparatus of the invention comprises an interferometer with at least one beam splitting element, preferably a beam splitter or a waveguide coupler, a first photon input A, a second photon input B, a first photon output C, and a second photon output D. The interferometer has a first path and a second path, both of which have predetermined optical lengths and connect photon inputs A, B with photon outputs C, D such that photons entering the interferometer through input A and through input B are split by the beam splitter, travel along the first and second paths, are recombined in the beam splitter, or alternatively in a second beam splitter, and exit through the first photon output C and second photon output D. The apparatus also has a radiation generating device for producing photons in an intensity-squeezed state in which the amplitude $a_o^2$ of the photons is substantially certain and the phase $\phi$ of the photons is substantially uncertain, and for delivering the photons to one of the first and second photon inputs A, B. The apparatus also includes an optical path length adjustment for introducing an optical path length difference $\theta$ between the predetermined optical path lengths such that photons delivered to the first photon input A exit through the first photon output C and photons delivered to the second photon input B exit through the second photon output D.

The apparatus of the invention can function in many modes. For example, photons in a coherent state can be delivered to the first photon input A while photons in the intensity-squeezed state are delivered to the second photon input B. Under these conditions photons in the coherent state exit through the first photon output C and photons in the intensity-squeezed exit through the second photon output D. This order can also be reversed. In general, a predetermined number n of photons in the intensity-squeezed state is delivered to at least one of said photon inputs A, B during a period of time $\tau_p$.

The apparatus of the invention has a detector for detecting the photons exiting the interferometer and, if two intensity squeezed states are used, for computing a photon count difference between the number $N_c$ of photons exiting through first photon output C and the number $N_d$ of photons exiting through second photon output D. This photon count difference indicates the deviation of optical path length difference $\Delta\theta$ and is expressed by the equation $\Delta\theta \cdot \sqrt{(N_c)\cdot(N_d)} \sin(\phi)$.

The radiation generating device has an electrical current source, a resistive element connected in series with the electrical current source, and a photo-emitter element connected in series with the resistive element. The photo-emitter generates n of photons in the squeezed-intensity state during time period $\tau_p$.

A detailed description of the apparatus and method of the invention is given below in reference to the attached drawing figures.

DESCRIPTION

To gain a full appreciation for the invention it is helpful to first review its theoretical foundations. Classically, the electric field E(t) of an electromagnetic wave or a photon is conveniently described by two terms, or quadratures, according to the following equation:

$$E(t)=A_1(t) \cos(\omega t)+A_2(t) \sin(\omega t). \quad [1]$$

Figures 1A, 1B:
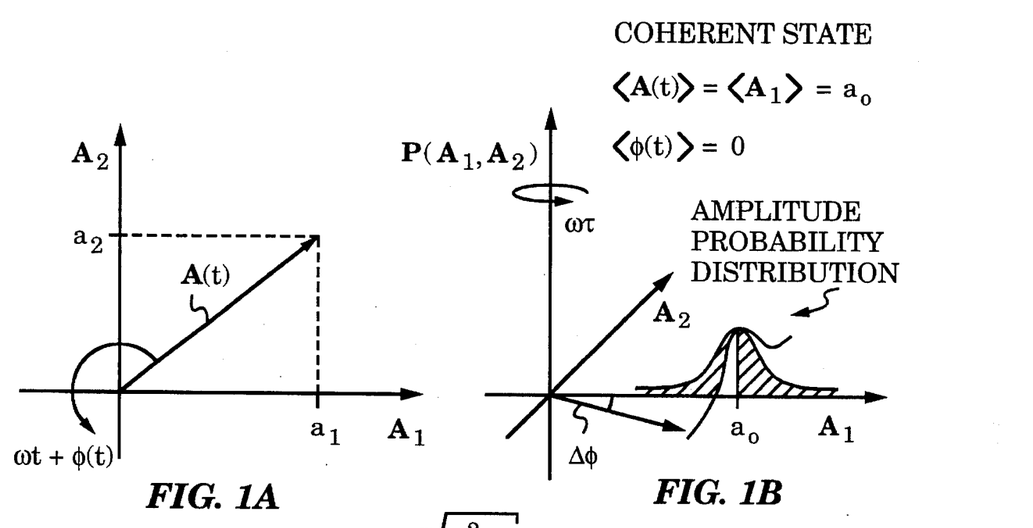
FIG. 1A is a graph depicting two conjugate quadratures of an electromagnetic wave.
FIG. 1B is a graph showing the statistical distribution of a coherent state.

In this expression $A_1(t)$ and $A_2(t)$ are time-dependent slowly varying (compared to $\cos(\omega t)$) amplitudes and $\omega$ is an angular frequency. Since the sine and cosine functions are mutually orthogonal, $A_1(t)$ and $A_2(t)$ are independent and can be graphed on two axes as shown in FIG. 1. In fact, FIG. 1 represents a specific point in time when the values of $A_1(t)$ and $A_2(t)$ are $a_1$ and $a_2$ respectively. The resultant amplitude A(t) of quadratures $A_1(t)$ and $A_2(t)$ is obtained by applying the Pythagorean Theorem ($A(t)=\sqrt{A_1^2(t)+A_2^2(t)}$). Now equation [1] can be rewritten in terms of only the resultant amplitude A(t) as follows:

$$E(t)=A(t) \cos[(\omega t)+\phi(t)] \quad [2]$$

where $\phi(t)=\arctan[A_2(t)/A_1(t)]$ is the phase factor. Let us examine the case where amplitudes $A_1(t)$ and $A_2(t)$ are not directly time-dependent, i.e., $A_1(t)=A_1$ and $A_2(t)=A_2$. Due to this assumption the resultant amplitude A(t) is not a direct function of time, i.e., A(t)=A, and, as shown in FIG. 1A, it revolves around the origin at a constant rotational velocity as time advances.

Quantum mechanics imposes two limitations on electromagnetic radiation, namely: quantization and Heisenberg's uncertainty principle. According to the first restriction electromagnetic radiation exists only in the form of discrete photons, i.e., a photon is an indivisible entity. The uncertainty principle dictates how much information can be gathered about a photon. In particular, this principle imposes a trade-off condition on measurements of pairs of related physical parameters or observables (non-commuting observables). Amplitudes $A_1$ and $A_2$ are a pair of such parameters. So are the phase $\phi$ and the photon number $n=A^2 \cdot \tau$, where $A^2$ is the light intensity and $\tau$ is the fixed integration time of the measurement. High accuracy measurement of a photon's intensity (or photon number if the integration period $\tau$ is fixed) precludes one from gaining precise information about its phase and vice versa.

FIG. 1B elucidates how the above rules apply to a number n of photons in a coherent state. The z-axis indicates the probability $P(A_1, A_2)$ of the photons simultaneously having the quadrature amplitudes $A_1$ and $A_2$. The x-y axes denote the photon's potential quadrature amplitudes $A_1$ and $A_2$.

Two simplifying assumptions are made. First, the time average of the phase factor $\phi(t)$ is assumed to be zero ($<\phi(t)>=0$), meaning that the photons have, on the average, the same phase. Photons in a coherent state abide by this rule. Second, the coordinate system rotates around the z-axis at angular speed $\omega$.

A measurement of the photon number of a coherent state will yield a Poissonian distribution. The most probable photon number n for the state in FIG. 1B will be $a_o^2\tau$ as illustrated in FIG. 1C.

In general, it is true for a Poissonian distribution that its variance is equal to its mean. This fact can be stated mathematically as follows:

$$<(\Delta A^2\tau)^2>=<(A^2\tau)^2>-<A^2\tau>^2=a_o^2\tau \qquad [3]$$

Figure 1C:
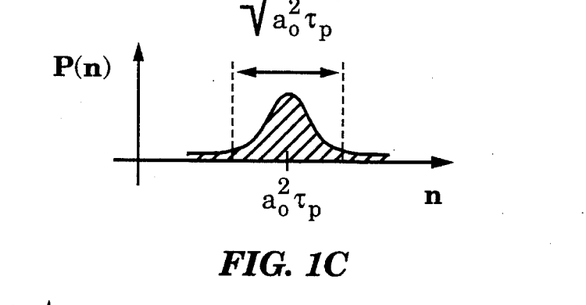
FIG. 1C is a graph further showing the Poissonian distribution of the expected photon number n for the coherent state.

Consequently, the photon number of most measured states will be contained within a deviation $\Delta n$ equal to $\sqrt{a_o^2\tau}$, as shown in FIG. 1C. As more photons n in the coherent state are measured, e.g., by extending the integration time $\tau$, the relative fluctuation $\Delta n/n$ in photon number will decrease according to the equation:

$$\text{Relative fluctuation} = 1/\sqrt{n} \qquad [4]$$

Also, the expected phase deviation $\Delta\phi$ of the measured states is centered around zero and is described by a Gaussian distribution of width:

$$\Delta\phi = <\Delta\phi^2>^{1/2} = \frac{1}{2\sqrt{<n>}} \qquad [5]$$

Figure 2:
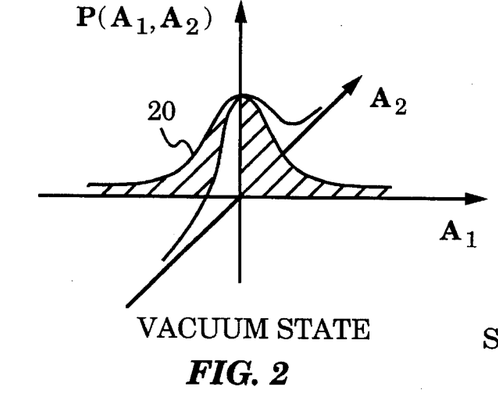
FIG. 2 is a graph of the zero-field fluctuations in the two conjugate quadratures (vacuum state).

In addition to the above rules governing photons, quantum mechanics describes the behavior of a vacuum. Even in the absence of photons the vacuum exhibits a quadrature amplitude, or, equivalently, an amplitude and a phase. These disturbances are commonly referred to as vacuum fluctuations or noise. The vacuum state is shown in FIG. 2 which identifies a gaussion distribution 20 along the $A_1$ axis.

Figure 3:
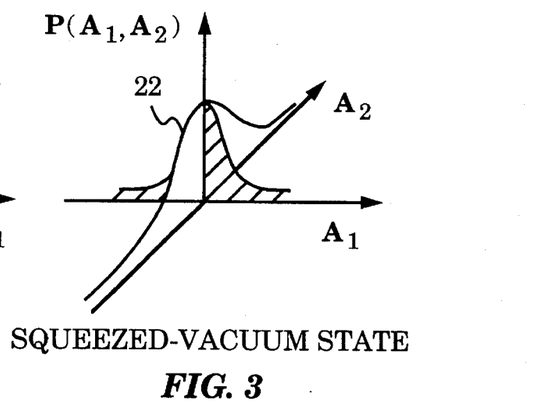
FIG. 3 is a graph of a squeezed vacuum state.

To suppress vacuum-generated noise the vacuum state can be altered to produce the so-called squeezed vacuum state illustrated in FIG. 3 which identifies a gaussian distribution 22 along the $A_2$ axis. In this condition the probability of noise is reduced, for example, in the $A_1$ quadrature. Consequently, according to Heisenberg's uncertainty principle, the noise in the $A_2$ quadrature will increase. Nonetheless, when this squeezed vacuum state is mixed with a coherent state by, e.g., a beamsplitter, the noise in the resulting (beamsplitter output) $A_1$ quadrature is effectively reduced. This is the principle governing most prior art quantum noise reduction systems.

Figure 4A:
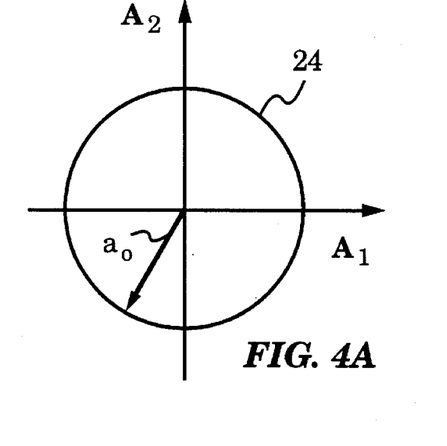
FIG. 4A is a graph of a pure number state (Fock state).
Figure 4B:
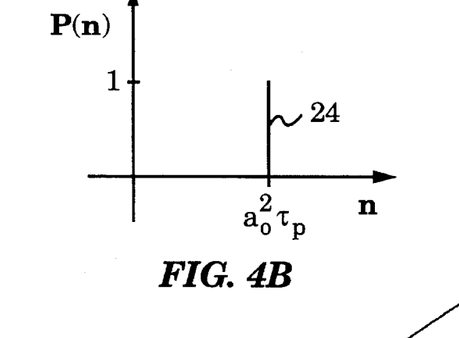
FIG. 4B is a graph of the expected intensity for the Fock state.

The underlying theory of this invention is a radical departure from the prior art, in that it abandons squeezing the vacuum or using the coherent photon state to make measurements. In fact, the invention uses an intensity-squeezed state or quasi-Fock state for performing interferometric measurements. FIG. 4A shows a pure Fock state, sometimes also called a number state. A resultant amplitude $a_o$ of amplitudes $A_1$ and $A_2$ is constant in time. Thus, all possible values of $a_o$ are described by a locus 24 in the form of a circle of radius $a_o$. In this state all information about the phase of a photon is lost, and thus using such a state to measure phase changes appears entirely unobvious to those skilled in the art. Nonetheless, in return for sacrificing all knowledge about the phase, one can know the exact intensity of the photon; in this case $a_o^2$ as illustrated in FIG. 4B and the photon number uncertainty $\Delta n$ is identically zero. In other words, locus 24 is located at the value $n=a_o^2\tau p$ photons exactly.

Figure 5:
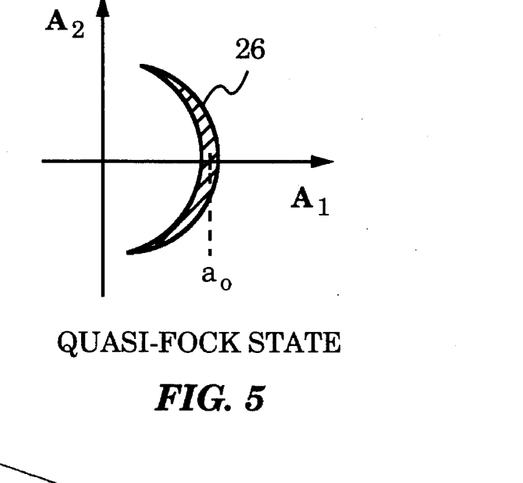
FIG. 5 is an intensity-squeezed state according to the invention.

In practice a pure Fock state is very difficult to produce. Therefore, the invention uses a quasi-Fock state or an intensity-squeezed state as shown in FIG. 5. A locus 26 of points corresponding to the quasi-Fock state is graphed in the plane of amplitudes $A_1$ and $A_2$. As can be seen, a slight uncertainty in amplitude is incurred as a result. It may be noted that the intensity-squeezed state interpolates smoothly between the coherent state (no squeezing) and the Fock-state (perfect squeezing). The arrangement for producing photons in the intensity-squeezed state is a part of the invention and is described below.

Figure 7:
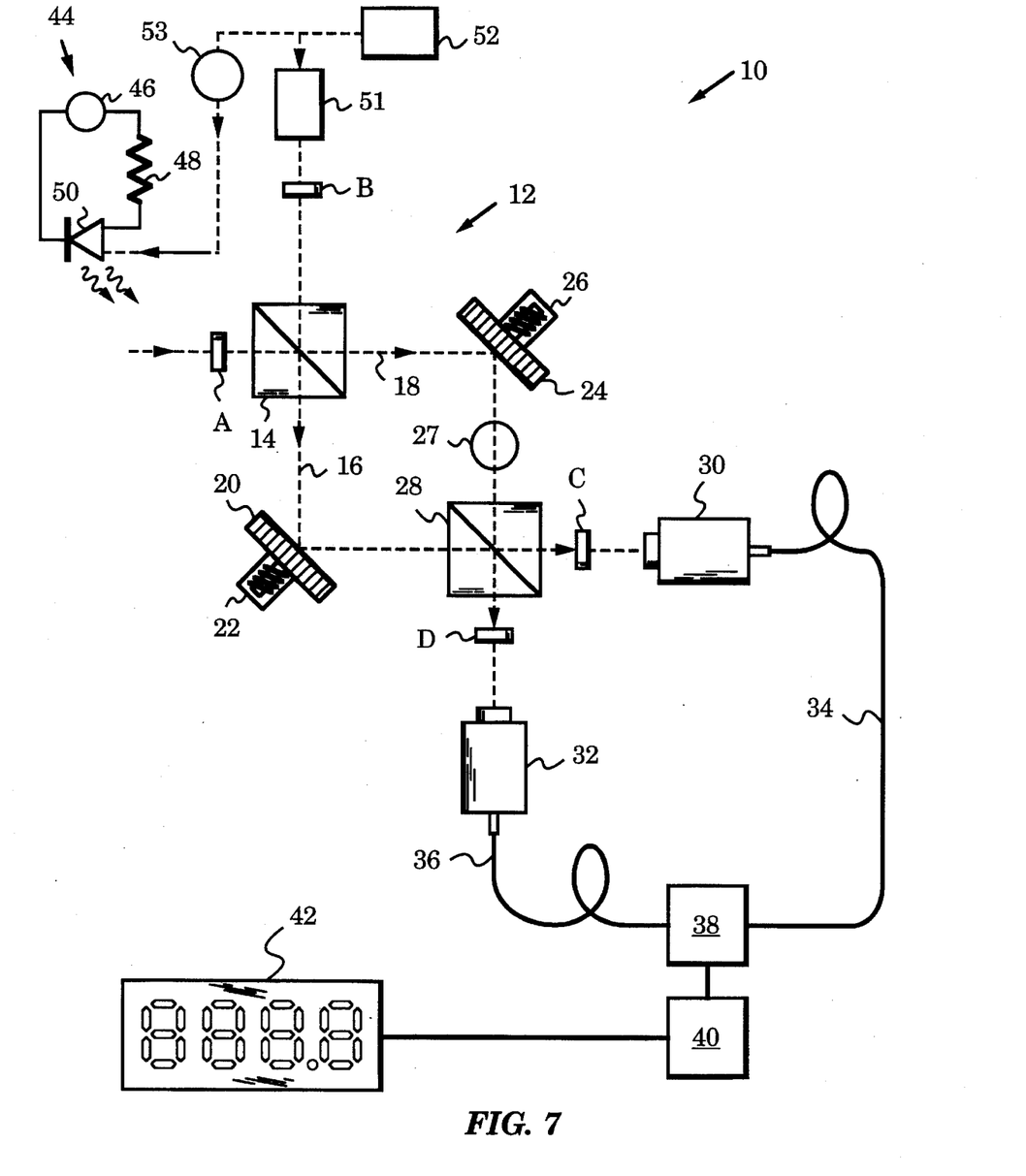
FIG. 7 is an apparatus of the invention using a Mach-Zehnder interferometer.

A preferred embodiment of the invention is shown in FIG. 7. An apparatus 10 for sub-Poissonian interferometry has at its heart an interferometer 12; here in the Mach-Zehnder configuration. Interferometer 12 has two ports or inputs A and B for admitting light along two intersecting paths. Physically, inputs A and B are preferably elements such as diaphragms, shutters, optical waveguides, optical fibers, or other known optical elements used for ensuring that only light intended for interference measurements is admitted inside interferometer 12. A beam splitting element 14, preferably a beam splitter cube or a waveguide coupler, is positioned at the place where light entering through input A crosses with the light let in through input B. Beam-splitter 14 has a 50/50 transmission to reflection ratio.

Transmitted and reflected light exits beam splitter 14 along a first optical path 16 and a second optical path 18. Two reflectors or mirrors 20 and 24 are placed in paths 16 and 18 respectively. These mirrors serve to reflect and direct light travelling along paths 16 and 18. Position adjustment mechanisms 22 and 26 enable proper alignment of mirrors 20 and 24. In particular, adjustment mechanisms 22, 24 enable a user to tune an optical path length difference $\Delta\theta$ between path 16 and path 18. (Of course, this can also be accomplished by fixing one mirror, e.g., 20, and only adjusting the position of mirror 24.)

The light travelling via path 18 will pass through a test region 27. In general, test region 27 will contain a material which affects the optical path length. In the simplest case region 27 will contain a material whose refracting index differs from the medium through which the light in arms 16 and 18 is propagating. Of course, the test material could be a gas present along the entire length of path 18. It is also conceivable that the measurements performed do not involve a test material at all, but focus instead on the shortening or lengthening of either path 16 or 18. A person skilled in the art will understand how to devise an appropriate test region 27 depending on the physical parameters to measured. In any of the above situations, however, the measurement will always involve a path length variation which can be interpreted as an optical path length change introduced in test region 27. This path length change is separate from the optical path length difference $\Delta\theta$ set by adjustment mechanisms 22, 24.

A second beam splitter 28 is positioned past region 27 where paths 16 and 18 intersect again. Beam splitter 28 has a 50/50 transmission to reflection ratio. Light exits beam splitter 28 along two directions and passes to output ports or outputs C and D through which it leaves interferometer 12. Outputs C and D are preferably shutters, diaphragms, optical waveguides, optical fibers, or other optical devices designed to only pass light coming from beam splitter 28.

Two photodetectors 30 and 32 are aligned with outputs C and D respectively. Photodetectors 30, 32 are set to detect photons of light exiting through outputs C and D, and convert them into corresponding electrical pulses at their outputs.

Electrical cables 34 and 36 connect the outputs of photodetectors 30, 32 to a current subtractor 38. Subtractor 38 is a standard device capable of counting electrical pulses coming from both detectors and computing a count difference. An integrator 40 for integrating the count difference over time is electrically joined to subtractor 38. Suitable integrators are commercially available. Finally, a display 42, preferably a digital visual indicator capable of displaying the integrated count difference, is connected to the output of integrator 40. Of course, additional electronics for deriving values related (e.g. by some constant offset) to the count difference can be present in the electrical arrangement.

Apparatus 10 also has two radiation sources 44 and 51 for generating photons in the squeezed-intensity state. Source 44 has an electrical current source 46. A resistive element 48 with a fixed resistance value is connected in series with current source 46. The resistance of element 48 is high compared to the emitter differential resistance. For semiconductor emitters the latter is of the order of 1 $\Omega$ and in this case the resistance of element 48 is preferably larger than 100 $\Omega$. A photo-emitter 50 is connected in series with resistive element 48. Preferably, photo-emitter 50 is a photo-emitting diode or another element capable of converting current into photons. Radiation source 51 is identical to radiation source 44. The two radiation sources 44 and 51 are mutually phase-locked by injecting into them a small optical signal from a master oscillator 52. The respective optical phase of radiation sources 44 and 51 is set to $\pi/2$ radians for optimum performance by adjusting the relative phases of the injected light by a phase-shifter 53. A person skilled in the art would have the knowledge to devise an opto-electrical control circuit needed to regulate phase-shifter 53 to make the two radiation sources 46 and 51 operate continuously with the optimum phase-difference setting.

There are many modes in which the embodiment of FIG. 7 can be operated. In the most convenient and preferred mode photons in the squeezed-intensity state are admitted into interferometer 12 through both inputs. In particular, radiation source 44 is first turned on to permit current source 46 to drive a current through resistive element 48 and photo-emitter 50. Because resistor 48 has a significantly larger resistance than photo-emitter 50 the former acts as a current stabilizer. This means that the current flowing through photo-emitter 50 is virtually void of fluctuations. Such steady current flow through photo-emitter 50 ensures that the number n of photons emitted during a period of time $\tau_p$, typically chosen to lie in the range 100 µs to 1 ns, is determined. Nothing is known about the phase $\phi$ of these photons. In other words, the emitted photons are in the desired intensity-squeezed state. The photons from radiation source 51 are is a similar state.

Figure 6:
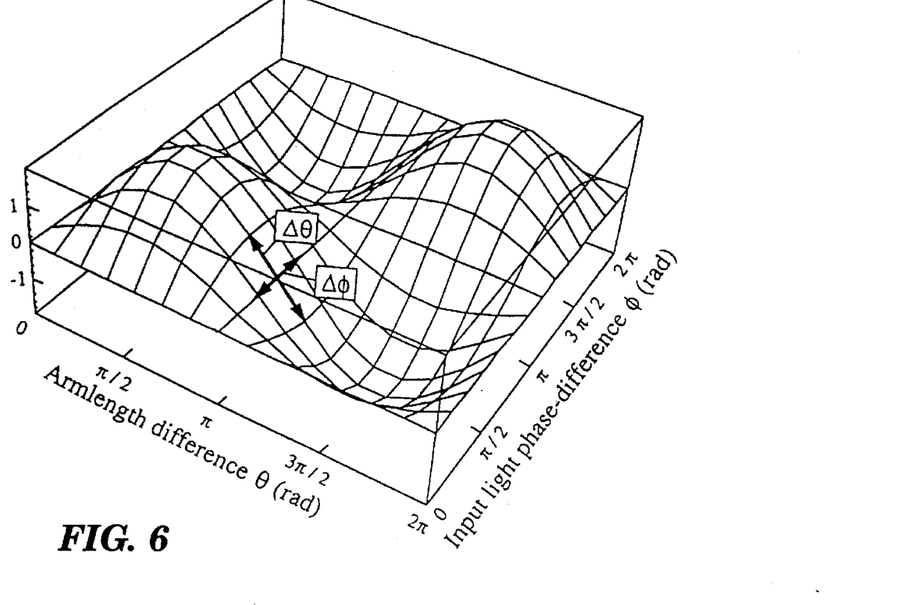
FIG. 6 is a graph of interferometer, characteristics.

The photons in the mutually phase-locked intensity-squeezed states are admitted into interferometer 10 through input A and B. Beam splitter 14 splits arriving photons and sends them along first path 16 and second path 18. Adjustment mechanisms 22 and 26 of mirrors 20 and 24 are set to produce an optical path length difference $\Delta\theta$ of $\pi$ or a multiple $i\pi$, where i is an integer. Of course, due to imperfections in a practical interferometer the actual adjusted phase optical path length difference $\Delta\theta$ will vary. Nevertheless, there will be points, separated by $\Delta\theta=i\pi$, at which interferometer 12 will act as a phase-dependent transparent beam splitter, as illustrated by the graph in FIG. 6.

In this special state all photons admitted through input A exit interferometer 12 through output C, and photons admitted through input B leave through output D irrespective of the photons' phase $\phi$. Thus, the n photons in the intensity-squeezed state admitted through input A exit through output C and impinge on photodetector 30. Meanwhile, the photons in the intensity-squeezed state admitted through input B exit through output D and impinge on photodetector 32.

Photodetectors 30 and 32 produce electrical signals in response to photons arriving from outputs C and D. The number of photons $N_c$ arriving from output C and the number of photons $N_d$ arriving from output D are thus converted into corresponding numbers of electrical pulses. These pulses are transmitted by cables 34 and 36 to current subtractor 38, which counts the arriving pulses and computes a count difference between the number $N_c$ of photons exiting through first photon output C and the number $N_d$ of photons exiting through said second photon output D. Integrator 40 integrates this count difference over time period $\tau_p$ in order to produce a statistically reliable figure which is ultimately displayed by display 42.

In the present mode of operation the optical path length difference $\Delta\theta$ is equal to $\pi$ and thus the number $N_c$ of photons exiting through output C is equal to n plus a number of noise photons due to the imperfect noise suppression of the state generated by radiation source 44. Likewise, the number $N_d$ of photons exiting through output D is equal to n plus a number of noise photons due to the imperfect noise suppression of the state generated by radiation source 51. The count difference $N_c-N_d$ thus would give a zero-signal if the states input through inputs A and B were both perfectly squeezed. When the squeezing is only partial, some residual noise will be present and photodetectors 30 and 32 will both exhibit sub-Poissonian photon count statistics. The key feature is that the difference noise can be substantially below the Poisson limit corresponding to n+n detected photons which would have been the case if ordinary laser-light would have been used in inputs A and B.

When an experiment is being performed there is an additional optical length change introduced by a test material in test region 27. The optical path length difference $\Delta\theta$ deviates from $i\pi$ and interferometer 12 no longer acts as a fully transparent phase-dependent beam splitter. The length difference $\Delta\theta$ will render the operating point such that the light from the two inputs A and B mix in each of the outputs C and D. Therefore, a small deviation from the preset optical path length difference $i\pi$ generates a stochastic photon count difference which is equal to:

$$\text{Photon count difference} = \Delta\theta \cdot \sqrt{(N_c) \cdot (N_d)} \quad \sin(\phi). \qquad [6]$$

Knowing that the smallest detectable photon count difference is one photon, the minimum deviation in path length difference $\Delta\theta_{min}$ can now be derived from equation [6]. Since the phase $\phi$ is random, $\sin(\phi)$ can be approximated by unity. One thus obtains:

$$\Delta\theta_{min} = \frac{1}{\sqrt{(N_c) \cdot (N_d)}}. \qquad [7]$$

This means that the sensitivity attainable with the apparatus of the invention is 1/n radians, where n is the number of photons admitted into each input of interferometer 12. This is well below the Poissonian limit of $1/\sqrt{n}$ photons. Considering that during an average measurement time period $\tau_p$ the number of photons generated by radiation source 44 is on the order of $6\times10^{12}$, the improvement in sensitivity can in principle be as large as six orders of magnitude.

In general, as stated in the BACKGROUND - DESCRIPTION OF PRIOR ART section, it is difficult to generate the perfectly squeezed light needed to reach the 1/n radian limit.

The invention circumvents this difficulty by trading of the requirement of perfect squeezing for slightly degraded sensitivity. If the input states are in squeezed-intensity states, the difference photo-count noise is 2kn where $0 \leq k \leq 1$. In order to detect a phase shift the photon count difference due to the phase-shift of the test region 27 given by [6], must be at least as large as the photon-count difference noise. In this case the sensitivity becomes:

$$\Delta\theta_{min} \approx \sqrt{k} / (N_c + N_d). \quad [8]$$

This is smaller than the Poisson limit since k<1. It is clear that the sensitivity improves continuously with improved intensity squeezing (reduction of k). However, equation [8] is an approximation and even if k=0, and one cannot surpass the sensitivity dictated by equation [7] even though equation [8] seems to indicate so.

In addition to improved sensitivity the apparatus of the invention lends itself to miniaturization and integration since it does not require high power laser sources or complicated circuitry. In fact, radiation source 44, 51 and 52 can be made cheaply and easily integrated into a single opto-electronic component. Entire apparatus 10 can be produced with conventional high volume semiconductor thin-film fabrication methods.

In addition, the apparatus of the invention does not preclude using intense coherent state light in one of the inputs A or B. In such an implementation one of the inputs would serve to admit photons in the intensity-squeezed state while the other input would pass photons in the coherent state. The two states would be phase-locked to each other by the same light injection technique as described above. In this case it is convenient to use some of the coherent light to phase lock the intensity squeezed radiation source. The mutual phase-shift difference would be adjusted to $\pi/2$ radians for optimum operation. In this embodiment the coherent photons incident on input B and, e.g., exiting from output C, are not used for the detection of the phase-shift, e.g., by disconnecting cable 34 in FIG. 7. In this set-up the sensitivity becomes:

$$\Delta\theta_{min} \approx \sqrt{k} / N_c, \quad [9]$$

where $N_c$ is the number of coherent state photons incident on input B during the time measurement time $\tau_p$, and it has been assumed that $N_c \gg N_d$. Once again, the standard measurement sensitivity limit is surpassed since the intensity squeezed radiation source at input B assures that k<1.

Figure 8:
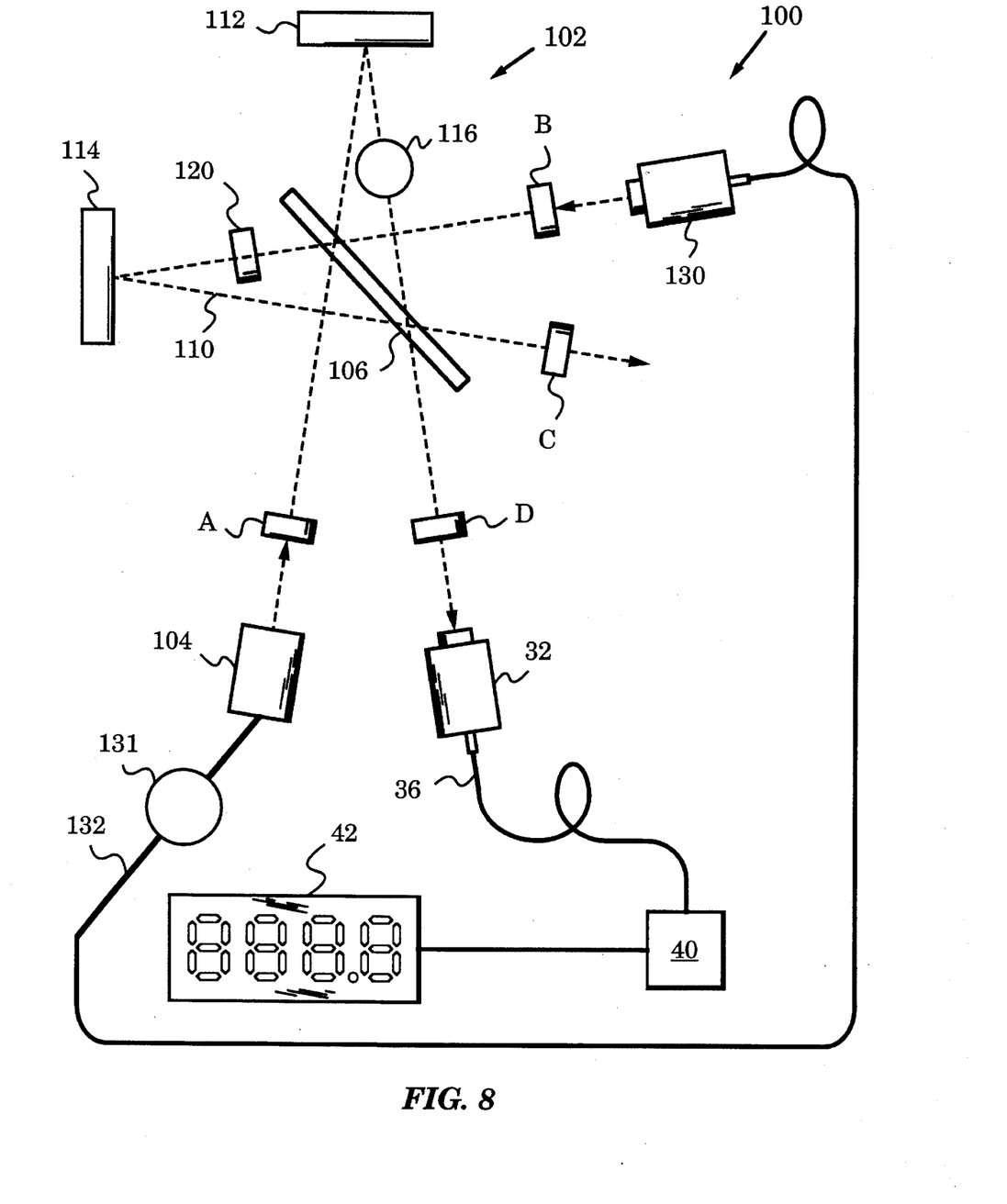
FIG. 8 is an apparatus of the invention using a Michelson-Morley interferometer.

One apparatus 100 of this embodiment of the invention uses a Michelson-Morley interferometer 102 as shown in FIG. 8. The inputs and outputs of interferometer 102 use the same references as the preferred embodiment described above. A radiation source 104, in this case a pump noise-suppressed laser, for generating intensity-squeezed photons is positioned in front of input A. A coherent state radiation source 130 is positioned in front of input B. A small portion of the coherent light (e.g. tapped from the rear of source 130) is used to phase-lock the light from the two radiators. The injection light can be delivered from radiation source 130 to radiation source 104 through an optical fiber 132, or by other means. A tuning device 131, such as a mobile translation stage for moving one end of the optical fiber, is used to tune the (relative) phase of the injection locking signal entering radiation source 104. The tuning could also be achieved through a non-moving waveguide, e.g., by changing the waveguide refractive index through the electro-optic effect. A person skilled in the art would know how to implement the phase-locking device in detail.

A beam splitter 106 is positioned at the intersection of photon paths 108 and 110. Mirrors 112 and 114 are located in paths 108 and 110. A half-wave plate 120 is positioned in path 110. A test region 116 is located in path 108. Mirrors 112 and 114 serve to direct photons travelling along these paths back to beam splitter 106, while, e.g., a wave-retarding plate 120 retards light travelling along path 110 to produce the optical path length difference $\Delta\theta$ between paths 108 and 110.

Two outputs C and D are positioned past beam splitter 106 in the path of exiting photons. A photodetector 32 is placed behind, e.g., output D. Output C is not used in this embodiment. The electrical connections of photodetector 32 now goes directly to the integrator 40 and the display 42.

This embodiment operates analogously to the preferred embodiment. Photons in the intensity-squeezed state are generated by pump noise-suppressed laser 104 and admitted into interferometer 102 through input A. The measurement time is set to time period $\tau_p$ during which the number of intensity-squeezed photons generated is n. During this time input B admits only coherent state photons.

Wave retarder 120 ensures that the optical path length difference $\Delta\theta$ between paths 108 and 110 renders interferometer 102 a phase-dependent beam splitter so that in absence of a phase-shift in test region 116, all intensity squeezed light exits the interferometer through output D while the coherent light exits through output C. Theoretically, the path length difference required to achieve this is $i\pi$, where i is an integer. In practice, small adjustments may be necessary. Deviations from the optical path length difference $\Delta\theta$ disturb this condition and cause a difference in the photon count which will be displayed by display 42.

This embodiment has all of the advantages of the preferred embodiment and the interferometric portion is even more compact, since only one beam splitter is used. Consequently, integration and miniaturization of this portion is easier. In a fully integrated version of this embodiment the beam-splitters would be substituted by a dual-input dual-output waveguide coupler, the mirrors by integrated waveguide Bragg mirrors and the input-output ports by a waveguide directional coupler. Using semiconductor lasers as radiation sources, the whole unit, including the laser driver circuit, the detectors and the electronics processing and displaying the detector signal could be fabricated and integrated on the same semiconductor chip using thin-film epitaxial and lithographic techniques.

Figure 9:
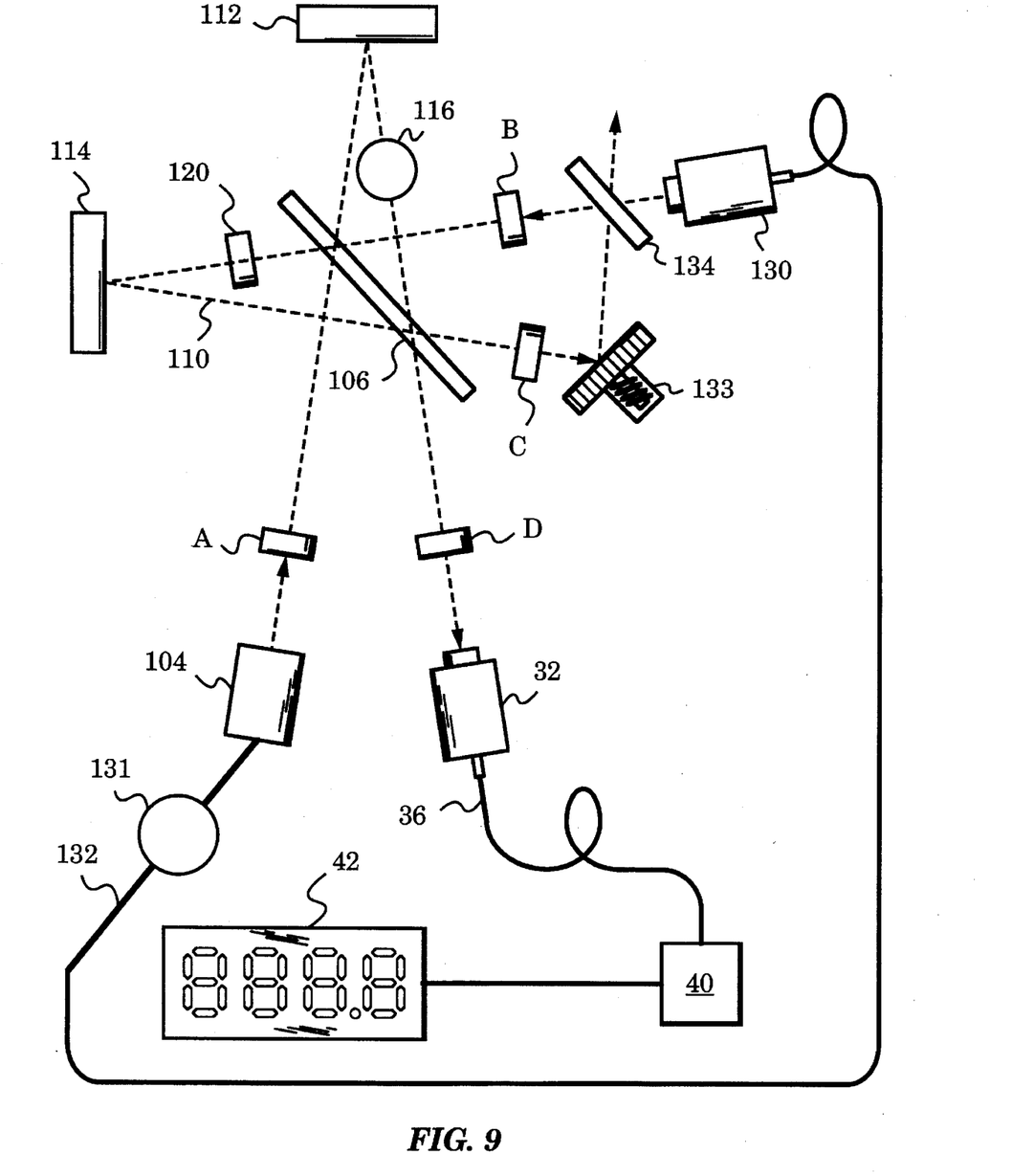
FIG. 9 is an apparatus of the invention using a Michelson-Morley interferometer and coherent state photon recycling.

In a second variation on the above embodiment, as shown in FIG. 9, the unused coherent state light exiting the interferometer through output C could be recycled by redirecting it to the input B though one totally reflecting mirror 133 and one partially reflecting mirror 134. The input B and output C would both be part of a ring cavity in such a configuration. Some means of locking the resonance wavelength of this resonator to that of the coherent state radiator, such as a movable mirror 133, must be included. A person skilled in the art would know how to implement such a locking mechanism. The ring resonator could also be implemented by connecting one end of an optical fiber to output C and the other end to the input of a waveguide coupler. The coherent state radiation source 130 would be connected to the other input of the waveguide coupler and finally one of the waveguide coupler outputs would be connected to input B. By recycling the coherent photons, a light intensity substantially larger than that output from the coherent radiator source 130 is going to build up inside the ring cavity, part of which is the interferometer. This will magnify the sensitivity of the interferometer by the same factor as the intensity of the circulating coherent light is magnified. The magnification factor is on the order of $1/(1-R)$, where R is the reflectivity of the partially transmitting beamsplitter 134.

SUMMARY, RAMIFICATIONS, AND SCOPE

The presented apparatus and method for performing sub-Poissonian interferometry are exemplary and should not be construed to limit the scope of the invention. Indeed, many modifications can be added to the embodiments described above.

For example, any electrical arrangement ensuring steady current flow through photo-emitter 50 will secure the release of a well-defined number n of photons during a period of time $\tau_p$. Such arrangement can be used as a source of intensity-squeezed photons rather than the described circuit or a pump noise-suppressed laser.

Therefore, the scope of the invention should be determined, not by examples given, but by the appended claims and their legal equivalents.

We claim:

1. An apparatus for performing sub-Poissonian interference measurements, said apparatus comprising:
   a) an interferometer comprising:
      1) a beam splitting means,
      2) a first photon input A,
      3) a second photon input B,
      4) a first photon output C, and
      5) a second photon output D, said interferometer having a first path and a second path both having predetermined optical lengths and connecting said photon inputs A, B and said photon outputs C, D such that photons entering said interferometer through said first photon input A and through said second photon input B are split by said at least one beam splitting means, travel along said first path and said second path, are recombined by said at least one beam splitting means, and exit through said first photon output C and said second photon output D;
   b) a radiation generating means for producing photons in an intensity-squeezed state in which the amplitude $a_o^2$ of the photons is certain and the phase $\phi$ of the photons is uncertain, and for delivering the photons in said intensity-squeezed state to one of said first and second photon inputs A, B; and
   c) an optical path length adjustment means for introducing an optical path length difference $\Delta\theta$ between said predetermined optical path lengths such that said interferometer acts as a phase-dependent beam splitter and photons delivered to said first photon input A exit through said first photon output C and photons delivered to said second photon input B exit through said second photon output D.

2. The apparatus of claim 1, wherein a number n of photons in said intensity-squeezed state are delivered to both of said photon inputs A, B during a period of time $\tau_p$, and wherein the photons from the intensity-squeezed state delivered to input A exit through said first photon output C when photons in said intensity-squeezed state delivered to input B exit through said second photon output D.

3. The apparatus of claim 1, wherein photons in a coherent state are delivered to said first photon input A when photons in said intensity-squeezed state are delivered to said second photon input B, and wherein photons in the coherent state exit through said first photon output C when photons in said intensity-squeezed state exit through said second photon output D.

4. The apparatus of claim 1, wherein photons in a coherent state are delivered to said second photon input B when photons in said intensity-squeezed state are delivered to said first photon input A, and wherein photons in the coherent state exit through said second photon output D when photons in said intensity-squeezed state exit through said first photon output C.

5. The apparatus of claim 1, further comprising a detection means for detecting the photons exiting said interferometer and computing a photon count difference between the number $N_c$ of photons exiting through said first photon output C and the number $N_d$ of photons exiting through said second photon output D, whereby said photon count difference indicates the deviation of said optical path length difference $\Delta\theta$ and is expressed by the equation $\Delta\theta \cdot \sqrt{(N_c) \cdot (N_d)} \sin(\phi)$.

6. The apparatus of claim 1, wherein said radiation generating means is a pump noise-suppressed laser.

7. The apparatus of claim 1, wherein said optical path length adjustment means comprises a reflector with a position adjustment mechanism.

8. The apparatus of claim 7, wherein said reflector is positioned in said first optical path.

9. The apparatus of claim 7, wherein said reflector is positioned in said second optical path.

10. The apparatus of claim 1, wherein said optical path length adjustment means comprises a wave retarding means positioned in one of said arms.

11. The apparatus of claim 1, wherein said radiation generating means comprises:
    a) an electrical current source;
    b) a resistive element connected in series with said electrical current source; and
    c) a photo-emitter element connected in series with said resistive element for emitting a predetermined number n of photons in said squeezed-intensity state during a time period $\tau_p$.

12. A method for performing sub-Poissonian interference measurements using an interferometer having a first path and a second path both having predetermined optical lengths and comprising a first photon input A and a second photon input B, and a first photon output C and a second photon output D, such that photons entering said interferometer through said first photon input A and through said second photon input B are split by a beam splitting means, travel along said first path and said second path, are recombined by said beam splitting means, and exit through said first photon output C and said second photon output D, said method comprising the following steps:
    a) generating photons in an intensity-squeezed state in which the amplitude $a_o^2$ of the photons is certain and the phase $\phi$ of the photons is uncertain;
    b) sending said photons in the intensity-squeezed state into one of said first photon input A and said second photon input B; and
    c) adjusting an optical path length difference $\Delta\theta$ between said predetermined optical path lengths such that said interferometer acts as a phase-dependent beam splitter and photons delivered to said first photon input A exit through said first photon output C and photons delivered to said second photon input B exit through said second photon output D.

* * * * *